April 23, 1968  G. A. STAAF  3,379,418
PIPE MIXER

Filed Jan. 31, 1967  3 Sheets-Sheet 1

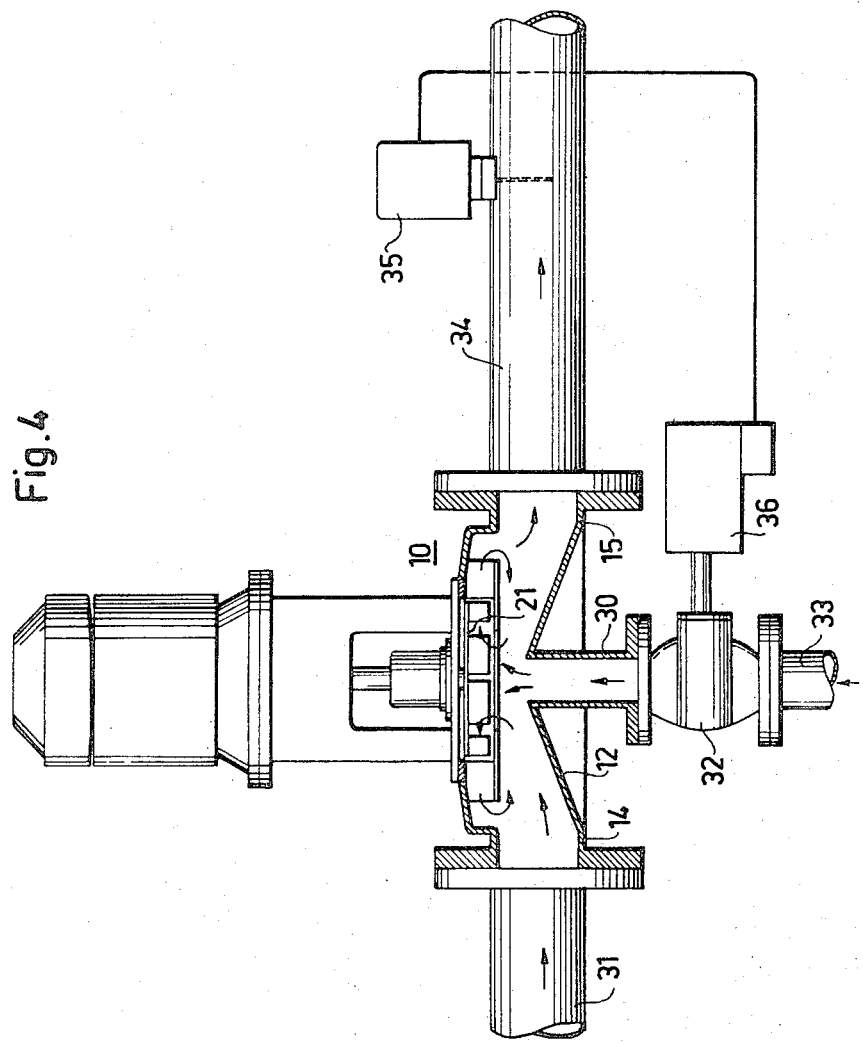

United States Patent Office 3,379,418
Patented Apr. 23, 1968

3,379,418
PIPE MIXER
Gustaf Adolf Staaf, Navigatorgatan 6,
Vasteras, Sweden
Filed Jan. 31, 1967, Ser. No. 613,007
Claims priority, application Sweden, Feb. 17, 1966,
2,061/66
2 Claims. (Cl. 259—8)

ABSTRACT OF THE DISCLOSURE

This invention relates to an arrangement for supplying mixing action to a plurality of components passing through a pipeline or conduit, comprising an impeller arranged in the pipeline opposite a convex section of the pipeline.

---

The present invention relates to a so-called pipe mixer, that is, a device for mixing a fluid flow composed of a plurality of components during its passage through a pipe line, or conduit.

The invention has for its object to provide a pipe mixer adapted to secure an intimate mixture of the component flows without introducing any substantial additional flow resistance into the conduit.

A pipe mixer having these characteristics and realised in accordance with the invention is mainly characterised in that it comprises a mixer housing, a pump impeller disposed adjacent one end wall of said housing and having its axis substantially coincident with the axis of the mixer housing, an annular disc disposed adjacent said pump impeller and defining a pump chamber having a central inlet and an annular outlet, a plurality of suitably planar turbulence-producing vanes disposed within the pump chamber adjacent said outlet, and a number of pipe-connecting studs opening into the space between said annular disc and the other end wall of the mixer housing.

The pump capacity should be so chosen that the rate of flow of fluid circulating through the pump will be substantially in excess of the rate of flow of the fluid supplied into, or discharged from, the mixer housing, respectively. Particularly favourable mixing conditions will be created if the end wall delimiting the open space on the outside of the annular disc is given an inwardly convex shape so as to guide the fluid circulating through the mixer housing in its flow towards the suction inlet of the pump.

The invention will now be described more in detail in conjunction with the accompanying drawings, in which:

FIGURE 4 is a view similar to that of FIGURE 1 but illustrating a somewhat modified embodiment of the invention.

Figure 1:
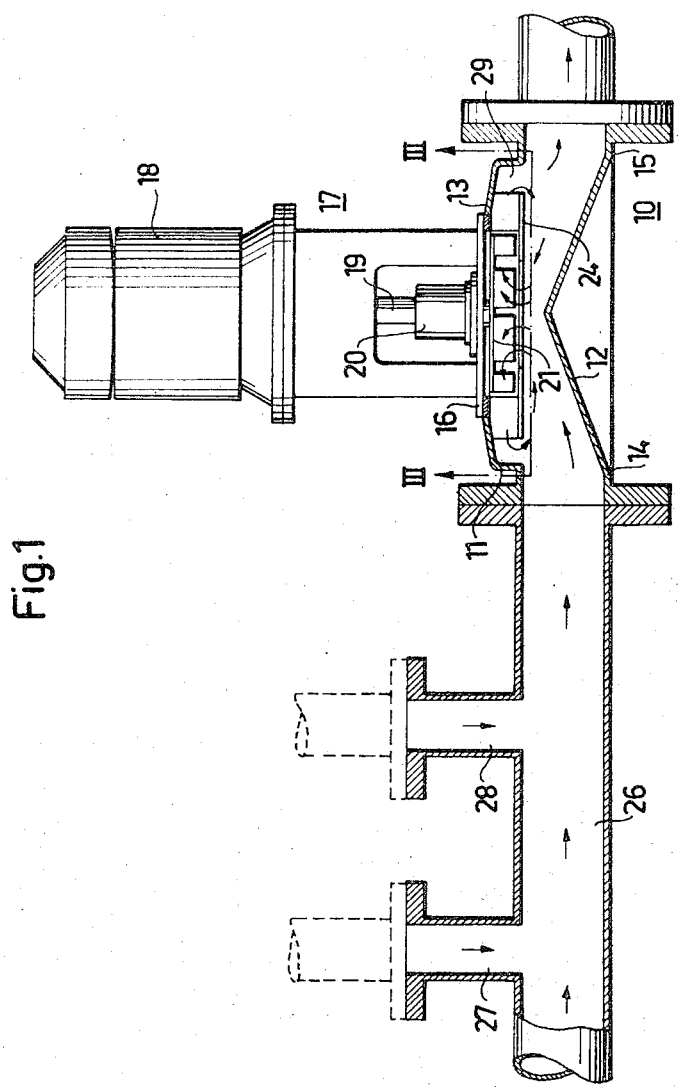
FIGURE 1 shows in side elevation, in part in axial section, a mixer according to a first embodiment of the invention.
Figure 2:
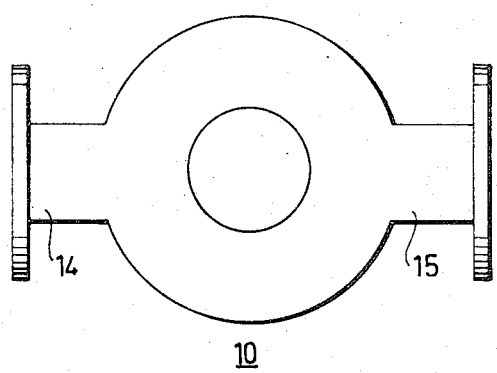
FIGURE 2 is a top-plan view of the mixer housing according to FIGURE 1.
Figure 3:
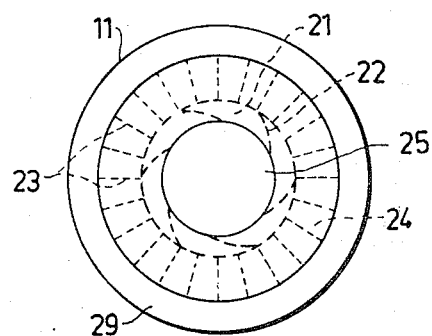
FIGURE 3 is a cross section through the mixer housing taken along line II—II in FIGURE 1.

Referring now to the drawings more specifically, numeral 10 designates a circular-cylindrical mixer housing comprising a peripheral side wall 11, an inwardly conically convex bottom or lower end wall 12, and a slightly dome-shaped top-end wall 13. Numeral 14 designates an inlet pipe connecting a stud formed on the side wall adjacent the bottom wall, and numeral 15 designates an outlet pipe connecting a stud formed diametrically opposite the first-mentioned stud. Formed centrally in the top-end wall is a circular-cylindrical opening which is closed by a detachable closure 16 forming at the same time a base plate of a stand 17 carrying an electric motor 18. An extension 19 of the motor shaft, which is passed down through the cover 16 in a watertight manner by passing through a gland 20, carries at its lower end a pump impeller 21 having inclined vanes 22. Disposed near the impeller are a large number of radially extending planar vanes 23 which are fixed on the underside of the cover 16 and terminate in spaced relation to the inner surface of the side wall of the mixer housing. Fastened to the lower edges of the fixed vanes 23 is a circular disc 24 having a central opening 25 with a diameter substantially corresponding to the diameter of the inscribed circle of the set of impeller vanes.

According to FIGURE 1, there is connected to the inlet stud 14 a pipe 26 which has connected to it two further pipes 27 and 28. Through the pipes 26, 27 and 28, the mixer housing will have supplied into it via inlet stud 14 an incomplete mixture of three different components or fluid flows which fill the mixer housing and continuously leave the same through outlet stud 15. During their passage through the mixer housing, said fluid flows will be subjected to an intensive mixing action by means of the pump impeller 21. The fluid stream will be forced throuh the central opening 25 in disc 24 to be then driven by the impeller radially outwards in between the vanes 23, further through the annular slot 29 between the annular disc 24 and the side wall 11 of the mixer housing and thence back into the space in the mixer housing beneath or outside the annular disc. The straight vanes 23 cause a forceful turbulence in the fluid passing between the same, thereby securing an intimate mixing of the different components of the fluid flow. The pump capacity is sufficient to cause the rate of flow of fluid circulating through the pump to exceed substantially the rate of flow of the fluild supplied to the mixer housing through connecting stud 14, or discharged from the mixer housing through connecting stud 15, respectively. This will ensure sufficient time for the component fluids to mix intimately with each other during their passage through the mixer housing.

It is seen from the drawing, that the inlet connection 14 and the outlet connection 15 are in direct communication with each other through the open space within the mixer housing outside the annular disc 24 formed with a suction inlet opening. Thus, the mixer will not create any additional pressure drop within the conduit system. The pump may be said to divert the stream of different fluid components flowing through the mixer housing into a by-pass circuit within which an intimate mixing action takes place before the fluid flow leaves the mixer housing. The cone-shaped bottom 12 of the mixer housing will direct the fluid stream towards the suction inlet opening, at the same time forcing the through-flow, during its passage through the mixer housing, to divide into two branches flowing in semi-circular paths beneath the annular outlet slot 29 of the pump, thereby ensuring still further that all component flows will have been intimately mixed together on their arrival at the outlet connection 15.

The embodiment shown in FIGURE 4 distinguishes from that of FIGURE 1 only in that a second inlet connecting stud 30 is disposed in the central portion of the conically inward-tapering bottom wall 12 of the mixer housing. The component flow entering through connecting stud 30 is received directly by the pump and has no possibility whatever of flowing directly to the outlet connection 15.

In FIGURE 4 the mixer is being used for controlling the fibre concentration of a fibre suspension supplied to the mixer housing 10 through pipe 31. The central connecting stud 30 is connected through a control valve 32 to a dilution water supply pipe 33. Disposed within the pipe 34 through which water diluted fibre suspension is discharged from the mixer housing, is a sensor 35 adapted to contact, in response to the fibre concentration, a regulator 36 known per se to cause the latter to actuate control valve 32 in a manner to cause the correct rate of flow of dilution water to be fed into the mixer housing.

It should be understood that the invention is not restricted to the embodiments thereof described here in detail and illustrated in the accompanying drawings. In particular, a different design of the mixer housing would be conceivable, as well as a different disposition of the inet and outlet connections.

What I claim is:

1. An arrangement for supplying mixing action to a plurality of components in a pipeline which comprises the interposition in said pipeline intermediate its ends of a mixer housing, said mixer housing comprising
   (a) an inlet end,
   (b) an outlet end,
   (c) walls connecting said inlet and outlet ends,
   (d) a driven shaft entering through said walls intermediate said inlet end and said outlet end, the axis of said driven shaft being disposed at substantially a right angle to that axis of the mixer housing which extends between said inlet end and said outlet end,
   (e) an impeller means mounted on the lower end of said driven shaft, said impeller means comprising a plurality of turbulence producing vanes,
   (f) an annular disc positioned closely adjacent and below said impeller means, said disc having a central opening which assists in directing incoming liquid to said impeller means,
   (g) the portion of the wall of the mixer housing that is positioned opposite said impeller means having an inwardly convex shape that further assists in directing incoming liquid to said impeller mean.

2. An arrangement according to claim 1 wherein said mixer housing contains an additional fluid inlet that is located in the central portion of said inwardly convex side wall.

References Cited

UNITED STATES PATENTS 2,985,389  5/1961  Willems _____ 259—96 X

FOREIGN PATENTS 1,066,544  10/1959  Germany.

ROBERT W. JENKINS, *Primary Examiner.*